(12) United States Patent
Neuman

(10) Patent No.: US 7,877,752 B2
(45) Date of Patent: Jan. 25, 2011

(54) METHOD AND SYSTEM FOR EFFICIENT AUDIO SCHEDULING FOR DUAL-DECODE DIGITAL SIGNAL PROCESSOR (DSP)

(75) Inventor: Darren Neuman, Palo Alto, CA (US)

(73) Assignee: Broadcom Corp.

( * ) Notice: Subject to any disclaimer, the term of this patent is extended or adjusted under 35 U.S.C. 154(b) by 1413 days.

(21) Appl. No.: 11/300,610

(22) Filed: Dec. 14, 2005

(65) Prior Publication Data
US 2007/0136729 A1 Jun. 14, 2007

(51) Int. Cl.
G06F 9/46 (2006.01)
G06F 3/00 (2006.01)
G06F 17/00 (2006.01)
G06F 15/16 (2006.01)
G09G 5/399 (2006.01)

(52) U.S. Cl. ........................ 718/103; 718/102; 718/107; 710/29; 710/50; 700/94; 345/501; 345/540

(58) Field of Classification Search .................. 718/102, 718/103, 107
See application file for complete search history.

(56) References Cited

U.S. PATENT DOCUMENTS

| | | | | | |
|---|---|---|---|---|---|
| 5,640,563 | A | * | 6/1997 | Carmon | 718/102 |
| 5,696,534 | A | * | 12/1997 | Lavelle et al. | 345/540 |
| 5,925,115 | A | * | 7/1999 | Ponte | 710/50 |
| 6,275,239 | B1 | * | 8/2001 | Ezer et al. | 345/473 |
| 6,349,321 | B1 | * | 2/2002 | Katayama | 718/102 |
| 6,952,825 | B1 | * | 10/2005 | Cockx et al. | 718/102 |
| 7,107,590 | B2 | * | 9/2006 | Bril et al. | 718/103 |
| 7,150,017 | B1 | * | 12/2006 | Vogl et al. | 718/102 |
| 7,165,252 | B1 | * | 1/2007 | Xu | 718/102 |
| 7,272,672 | B1 | * | 9/2007 | Swenson et al. | 710/29 |
| 7,444,638 | B1 | * | 10/2008 | Xu | 718/104 |
| 2003/0025698 | A1 | * | 2/2003 | Riemens et al. | 345/501 |
| 2005/0022187 | A1 | * | 1/2005 | Park | 718/100 |
| 2008/0005392 | A1 | * | 1/2008 | Amini et al. | 710/29 |
| 2008/0022288 | A1 | * | 1/2008 | Bekooij | 718/107 |

OTHER PUBLICATIONS

Gerber et al, "Slicing Real-Time Programs for Enhanced Schedulability", acm, vol. 19, No. 3, May 1997, pp. 525-555.*
He et al., "Real-Time Distributed and Parallel Processing for MPEG-4", IEEE, 1998, pp. 603-606.*

* cited by examiner

Primary Examiner—Lewis A Bullock, Jr.
Assistant Examiner—Jennifer N To
(74) Attorney, Agent, or Firm—McAndrews, Held & Malloy, Ltd.

(57) ABSTRACT

Methods and systems for coordinating the handling of information are disclosed herein and may include scheduling multiple processing tasks for processing multimedia data by a processor. A portion of the scheduled multiple processing tasks may be preprocessed and the preprocessed portion may be buffered within a modifiable buffer that handles overflow and underflow. A portion of the buffered preprocessed portion of the scheduled multiple processing tasks may be executed. The scheduling may utilize a non-preemptive scheduling algorithm, such as an earliest deadline first (EDF) scheduling algorithm and/or a rate monotonic (RM) scheduling algorithm. The scheduled multiple processing tasks may include at least one maximum real deadline. The preprocessed portion of the scheduled multiple processing tasks may be outputted during processing of the blocking task, if a current task of the scheduled multiple processing tasks comprises a blocking task.

30 Claims, 10 Drawing Sheets

TASKS PRIOR TO EXECUTION

NON-PREEMPTIVE EXECUTION OF TASKS

US 7,877,752 B2

METHOD AND SYSTEM FOR EFFICIENT AUDIO SCHEDULING FOR DUAL-DECODE DIGITAL SIGNAL PROCESSOR (DSP)

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to processing multimedia information. More specifically, certain embodiments of the invention relate to a method and system for efficient audio scheduling for a dual-decode digital signal processor (DSP).

BACKGROUND OF THE INVENTION

Digital television, popularly referred to as DTV, is an enhanced television system capable of transmitting and receiving digitized signals, displaying digital images and playing digital audio. While some of these features may be present in current analog television systems such as the national television standards committee (NTSC) system, the sequential couleur avec memoire (SECAM) system and the phase alternate line (PAL) system, the combination of digitized transmission, reception, video and audio distinguishes digital television from current analog television systems.

Digital television employs various digital signal processing techniques and utilizes scarce bandwidth in a more spectrally efficient manner to transport and present audio and video signals in a way that is superior to current analog television systems. In this regard, digital television allows more channels containing more information to be broadcasted within an equivalent bandwidth utilized by current analog television systems. Accordingly, any excess bandwidth can be re-allocated for use by other types of communication systems. Broadcasters utilizing digital television systems are therefore, capable of providing over-the air television signals containing higher picture resolutions than current analog broadcast television systems In conventional HDTV applications, a single processor may be utilized for processing a plurality of audio and video tasks. Each of the plurality of audio and/or video tasks may utilize real deadlines for completing the processing of the tasks. For example, a digital signal processor (DSP) may be utilized to process a plurality of audio bitstream tasks for an audio processing application. Each audio bitstream task may have strict real time requirements for completing the corresponding processing task. Some conventional HDTV applications may not utilize task scheduling and, as a result, one or more audio bitstream processing tasks may be processed later than their corresponding real time completion deadlines. In such circumstances, the decoded audio stream may become de-synchronized which may significantly reduce the quality of the decoded audio stream. Most conventional HDTV applications utilize task scheduling with pre-emption in circumstances where a single processor has to process more than one task simultaneously. However, during preemptive processing of multiple tasks, the DSP frequently has to buffer large portions of data between executions of different tasks. Task scheduling with preemption may, therefore, be an undesirable method for scheduling multiple processing tasks as it increases memory use and reduces overall processing efficiency. In digital television (DTV) systems, for example, such scheduling may adversely affect audio and/or video quality.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for efficient scheduling for a dual-decode digital signal processor (DSP), substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for efficient scheduling for a dual-decode digital signal processor (DSP). In one embodiment of the invention, a plurality of multimedia tasks, such as audio tasks, may be scheduled utilizing a non-preemptive scheduling algorithm, such as an earliest deadline first (EDF) scheduling algorithm and/or a rate monotonic (RM) scheduling algorithm. Each of the scheduled plurality of multimedia tasks may comprise a real deadline for completing the task. A portion of scheduled multimedia tasks may be preprocessed by the DSP and the preprocessed portion may be buffered within a modifiable buffer that handles overflow and underflow. The modifiable buffer that handles overflow and underflow may be adapted to store preprocessed data with a size at least equal to the size of a blocking task which may be processed by a corresponding non-preemptive scheduling algorithm. For example, in instances where the DSP utilizes the EDF scheduling algorithm, the modifiable buffer may be adapted to store preprocessed data with a size equal to at least the size of a maximum blocking task. In instances where the DSP utilizes the RM scheduling algorithm, the modifiable buffer may be adapted to store preprocessed data with a size that may be equal to at least the size of a maximum blocking task plus the size of all tasks with higher priority than a currently processed task.

Figure 1A:
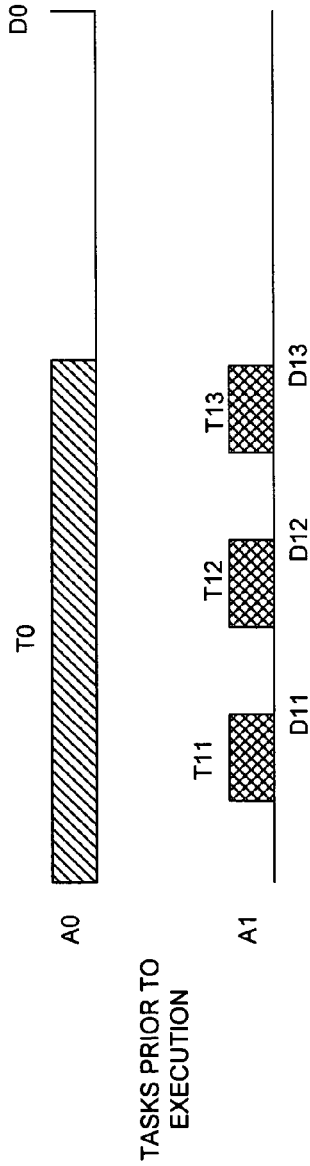
FIG. 1A is a diagram illustrating exemplary tasks within two audio bitstreams.

FIG. 1A is a diagram illustrating exemplary tasks within two audio bitstreams. Referring to FIG. 1A, there are illustrated a plurality of tasks within two audio bitstreams A0 and A1 prior to task execution. The audio bitstream A0 may comprise a task T0 with a real deadline D0. The audio bitstream A1 may comprise a task T1, which may be executed several times, while task T0 is being executed. For the duration of task T0, task T1 may be executed three times, for example. Each of the three executions of task T1, T11 through T13, may also comprise a real deadline. For example, the first execution of task T1 may comprise a real deadline D11. Similarly, the second task execution T12 may comprise a real deadline D12, and the third task execution T13 may comprise a real deadline D13. The plurality of tasks within the audio bitstreams A0 and A1 may be executed utilizing at least one of a plurality of scheduling algorithms. For example, tasks T0 and T11 through T13 within the A0 and A1 bitstreams may be executed utilizing non-preemptive scheduling algorithm and/or a preemptive scheduling algorithm.

Figure 1B:
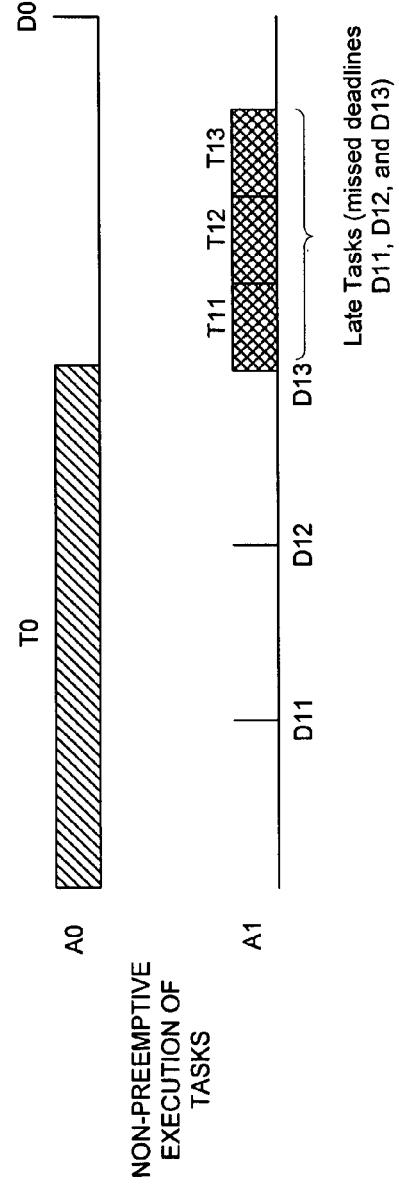
FIG. 1B is a diagram illustrating non-preemptive execution of tasks within two audio bitstreams.

FIG. 1B is a diagram illustrating non-preemptive execution of tasks within two audio bitstreams. Referring to FIG. 1B, there is illustrated non-preemptive execution of scheduled tasks within audio bitstreams A0 and A1. Audio bitstreams A0 and A1 in FIG. 1B may be the same as audio bitstreams A0 and A1, respectively, in FIG. 1A. In this regard, audio bitstream A0 may comprise a task T0 with a real deadline D0 and audio bitstream A1 may comprise task T1, which may be executed several times while task T0 is being executed. Each of the executions of task T1, T11 through T13, may comprise a deadline D11 through D13, respectively.

During non-preemptive execution of tasks, a current task that is being executed may not be interrupted until its execution is complete. In this regard, intervening tasks that have real deadlines which occur during the execution of the current task may not be processed until execution of the current task is complete. Consequently, one or more intervening tasks, such as tasks T11, T12, and T13, with deadlines occurring during the non-preemptive execution of a current task T0, may miss their deadlines and may be executed late.

Referring again to FIG. 1B, task T0 from audio bitstream A0 may be executed first. The processing of task T0 may be completed by its real deadline D0. However, during the execution of task T0, tasks T11 through T13 from audio bitstream A1 may have to be executed. Tasks T11 through T13 may have corresponding real deadlines D11 through D13, and the real deadlines D11 through D13 may occur during the processing of task T0 from audio bitstream A0. Consequently, during non-preemptive execution of task T0 from audio bitstream A0, task T0 may be processed uninterrupted while tasks T11 through T13 may be processed after task T0 is processed, thereby missing their real deadlines D11 through D13, respectively.

In other instances, tasks T11 through T13 from the audio bitstream A1 may have corresponding real deadlines D1 through D13, which may occur after completion of task T0 from audio bitstream A0. In this regard, tasks T11 through T13 may be processed after task T0 is processed and may be completed by their corresponding real deadlines D11 through D13, respectively.

Figure 1C:
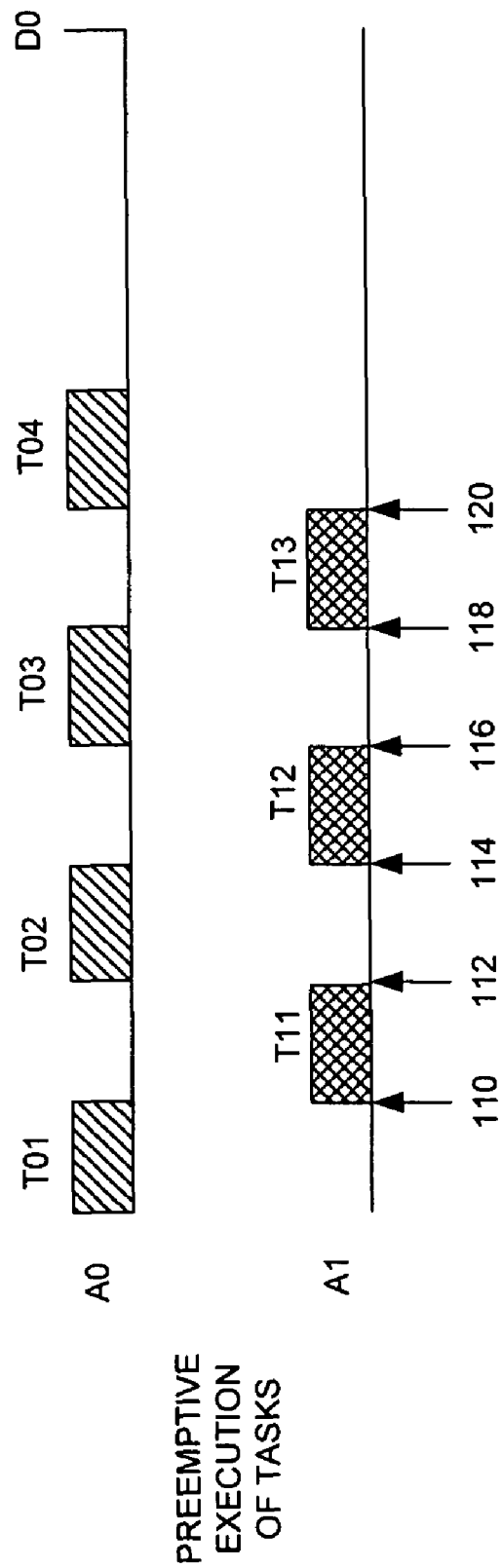
FIG. 1C is a diagram illustrating preemptive execution of tasks within two audio bitstreams.

FIG. 1C is a diagram illustrating preemptive execution of tasks within two audio bitstreams. Referring to FIG. 1C, there is illustrated preemptive execution of scheduled tasks within audio bitstreams A0 and A1. Audio bitstreams A0 and A1 in FIG. 1C may be the same as audio bitstreams A0 and A1, respectively, in FIG. 1A. In this regard, audio bitstream A0 may comprise a task T0, T01 through T04, with a real deadline D0, and audio bitstream A1 may comprise task T1, which may be executed several times, while task T0 is being executed. Each of the executions of task T1, T11 through T13, may comprise a real deadline D11 through D13, respectively, as illustrated in FIG. 1A.

During preemptive execution of tasks, a current task that is being executed may be interrupted until the task execution of an intervening task is complete. After the execution of the intervening task is complete, execution of a remaining portion of the current task may resume. In this regard, an intervening task that may have a real deadline occurring during the execution of a current task may be processed by its deadline by interrupting the execution of the current task. After preemptive execution of the intervening task is complete, execution of the current task may continue and may be completed by the real deadline of the current task. Consequently, one or more intervening tasks with deadlines occurring during the preemptive execution of a current task may meet their deadlines by interrupting execution of the current task.

Referring again to FIG. 1C, during preemptive execution of tasks T0 and T1 from audio bitstreams A0 and A1, a first portion of task T0, namely T01, may be executed first. At time instance 110, execution of task T0 may be interrupted and execution of task T11 may be initiated. At time instance 112, after execution of task T11 is complete, execution of task T0 may continue by executing portion T02 of task T0. Similarly, at time instance 114, execution of the second portion of task T0, namely T02, may be interrupted and execution of task T12 may be initiated. At time instance 116, after execution of task T12 is complete, execution of task T0 may continue by executing a third portion of task T0, namely T03. At time instance 118, execution of the third portion of task T0, namely T03, may be interrupted and execution of task T13 may be initiated. The execution of task T13 may be completed at time instant 120. At time instant 120, after the execution of task T13 is complete, execution of task T0 may continue by executing the fourth portion of task T0, namely T04. Consequently, during preemptive execution of tasks, the processing of task T0 may be interrupted and portions T01 through T04 of task T0 may be processed while tasks T11 through T13 are being processed. In this regard, both tasks T0 and T1 may be processed by their real deadlines. However, during time instants of switching between processing of portions of tasks T0 and T1, such as time instants 110, . . . , 120, significant portions of memory may be used to store intermediate results. In addition, memory bandwidth may be used to store intermediate results from one task during the switch to another task. In this regard, preemptive execution results in increase of the context switching overhead time and a decrease of the overall efficiency of the audio bitstream processing system.

In an exemplary embodiment of the invention, non-preemptive scheduling may be utilized for scheduling multiple processing tasks for processing multimedia data and at least a portion of the scheduled multiple processing tasks may be preprocessed. The preprocessed portion of the scheduled multiple processing tasks may then be buffered in a modifiable buffer that handles overflow and underflow. In this regard, excessive use of memory, memory bandwidth, and context overhead during preemptive processing, as described with regards to FIG. 1C above, may be avoided. During preprocessing, scheduled processing tasks may be processed ahead of their scheduled processing time. In this regard, preprocessed task results may be buffered and the buffered result may be utilized at a subsequent time to avoid processing delays and to ensure the preprocessed task meets its real deadline. Furthermore, non-preemptive processing of tasks may be achieved and each task may be processed by its corresponding real deadline, avoiding unprocessed tasks and missed deadlines, as described with regards to FIG. 1B above.

Figure 2A:
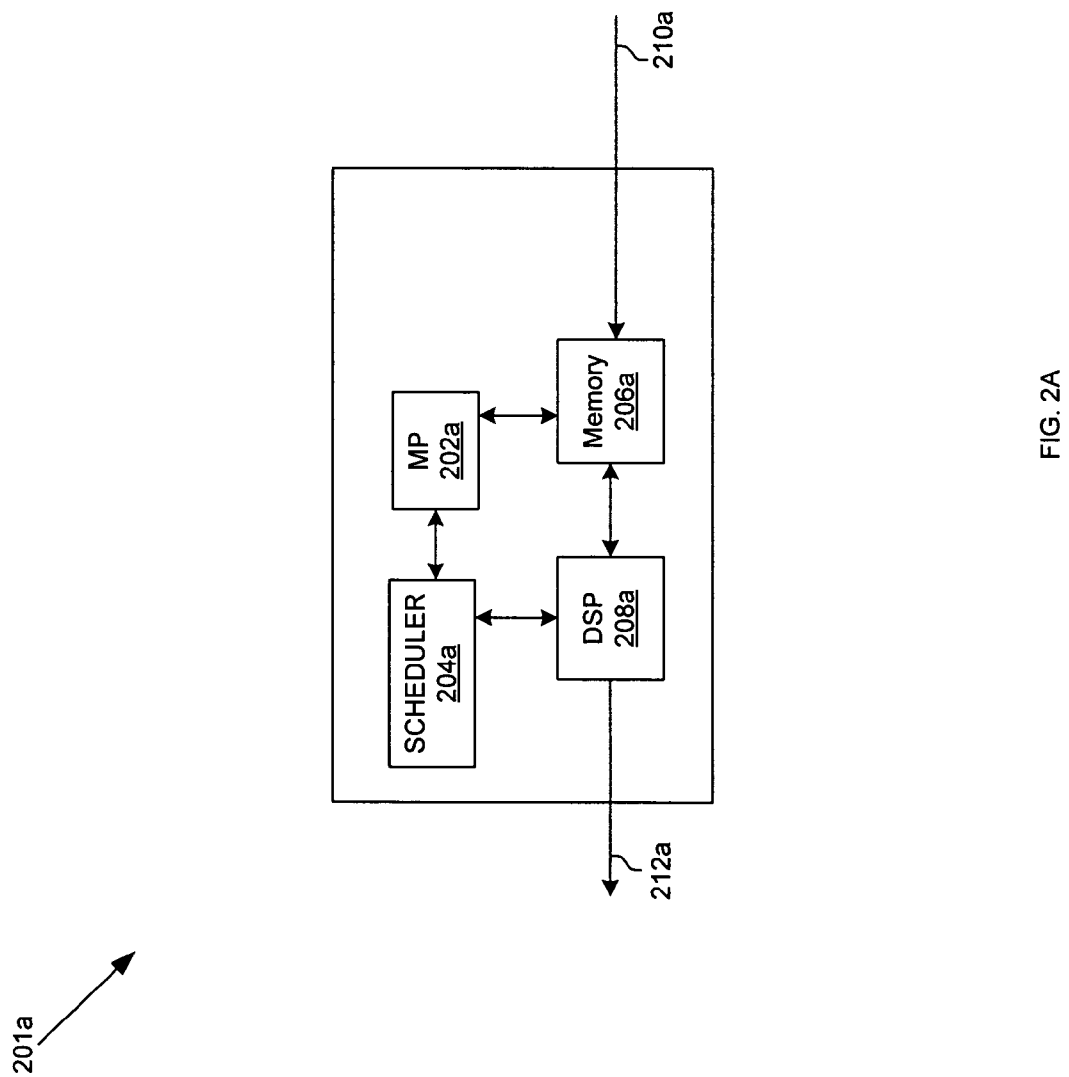
FIG. 2A is a high level block diagram of an exemplary system for processing audio bitstreams, in accordance with an embodiment of the invention.

FIG. 2A is a high level block diagram of an exemplary system for processing audio bitstreams, in accordance with an embodiment of the invention. Referring to FIG. 2A, the system for processing audio bitstreams 201a may comprise a scheduler 204a, a microprocessor 202a, memory 206a, and a digital signal processor (DSP) 208a. The scheduler 204a may be implemented in software, for example, and may be utilized by the microprocessor 202a to schedule execution of a plurality of processing tasks for processing data stored in the memory 206a. In an exemplary embodiment of the invention, the scheduler 204a may utilize a non-preemptive scheduling algorithm, such as an earliest deadline first (EDF) scheduling algorithm or a rate monotonic (RM) scheduling algorithm to perform scheduling. In another embodiment of the invention, the scheduler 204a may be implemented in firmware, as part of the DSP 208a.

In operation, a plurality of audio signals 210a from different sources may be communicated to the system for processing audio bitstreams 201a and may be stored in memory 206a. The microprocessor 202a may schedule processing or decoding of the audio data stored in memory 206a by using the scheduling functionalities performed by the scheduler 204a. The DSP 208a may acquire audio data stored in the memory 206a for decoding, based on the task scheduling performed by the microprocessor 202a. Decoded data 212a may be communicated outside the DSP 208a for further processing. For example, decoded data 212a may be processed by a digital-to-analog converter (DAC) and may be communicated to a speaker.

In an exemplary embodiment of the invention, the DSP 208a may be adapted to process audio data in advance of its scheduled processing time. Such preprocessed data may then be stored within a modifiable buffer within the memory 206a that may be adapted to handle overflow and underflow. Overflow may occur when the DSP 208a decodes data faster than processed data 212a is being consumed from the memory 206a. In instances where overflow occurs, extra processed data may be stored in the modifiable buffer within the memory 206a. Furthermore, the DSP 208a may be adapted to temporarily stop processing of data until, for example, the extra processed data stored in the modifiable buffer is utilized. Underflow may occur when processed data 212a is being consumed from the memory 206a at a rate that is faster than the rate the DSP 208a stores decoded new audio data into memory 206a. In instances where underflow occurs, preprocessed data may be read from the modifiable buffer and may be communicated outside the DSP 208a as the output data 212a.

Even though the signal processing system 201a is described for processing audio signals, the present invention may not be so limited. In another embodiment of the invention, the signal processing system 201a may be utilized to process other types of packetized data, such as video data.

Figure 2B:
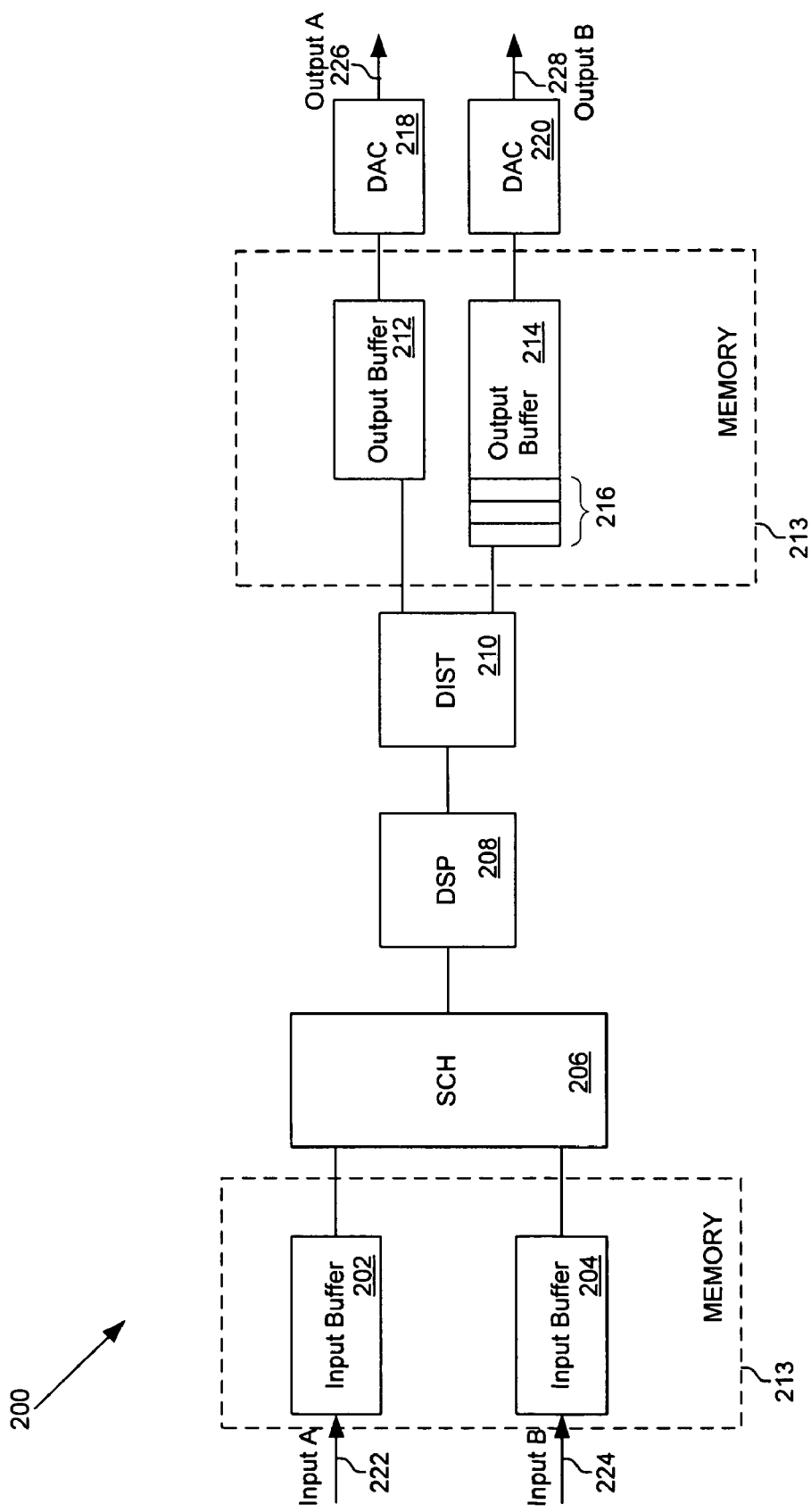
FIG. 2B is a block diagram of an exemplary system for processing audio bitstreams, in accordance with an embodiment of the invention.

FIG. 2B is a block diagram of an exemplary system for processing audio bitstreams, in accordance with an embodiment of the invention. Referring to FIG. 2B, the system for processing audio bitstreams 200 may comprise input buffers 202 and 204, a scheduling block 206, a processor 208, a distribution block 210, memory 213, and digital-to-analog converters (DACs) 218 and 220. The memory 213 may comprise output buffers 212 and 214. The input buffers 202 and 204 may also be located in memory 213.

The input buffers 202 and 204 may comprise suitable circuitry, logic, and/or code and may be adapted to buffer input bitstream A 222 and input bitstream B 224, respectively. The scheduling block 206 may comprise suitable circuitry, logic, and/or code and may be adapted to acquire buffered bitstream data from the input buffers 202 and 204 and to determine a single bitstream output for communication to the processor 208. The scheduling block 206 may utilize one or more scheduling algorithms to schedule processing of tasks from the input bitstream A 222 and input bitstream B 224. The processor 208 may be adapted to decode a plurality of audio bitstreams. In one embodiment of the invention, the processor 208 may comprise a dual-decode digital signal processor (DSP). The dual-decode DSP may be adapted to decode two bitstreams.

The distribution block 210 may comprise suitable circuitry, logic, and/or code and may be adapted to acquire processed, or decoded audio frames from the processor 210, and communicate the processed frames to the output buffer 212 or the output buffer 214, based on whether the processed data is from input bitstream A 222 or input bitstream B 224. In an exemplary embodiment of the invention, the scheduling block 206 and/or the distribution block 210 may be integrated within the processor 208.

The output buffers 212 and 214 may comprise suitable circuitry, logic, and/or code and may be adapted to buffer processed or decoded audio frames communicated from the processor 208 via the distribution block 210. Buffered frames may be communicated for further processing to the DACs 218 and 220. The DACs 218 and 220 may comprise suitable circuitry, logic, and/or code and may be adapted to convert processed digital audio data to analog output audio data stream A 226 and analog output audio data stream B 228.

In an exemplary embodiment of the invention, one of the output buffers 212 and 214, such as the output buffer 214, for example, may comprise extra buffer space 216. The extra buffer space 216 may be allocated for buffering preprocessed audio data. The processor 208 may generate the preprocessed audio data stored in the extra buffer space 216 by preprocessing a plurality of tasks from the input audio bitstream B 224. In this regard, the extra buffer space 216 may be allocated and utilized for handling overflow and underflow of decoded data.

Overflow may occur when the DSP 208 decodes data faster than processed data 226 or 228 is being consumed from the memory 213. In instances where overflow occurs, extra processed data may be stored in the modifiable buffer portion 216 within the memory 213. Furthermore, the DSP 208 may be adapted to temporarily stop processing of data until, for example, the extra processed data stored in the modifiable buffer portion 216 is utilized. Underflow may occur when processed data 226 or 228 is being consumed from the memory 213 at a rate which is faster than the rate the DSP 208 stores decode new audio data in the memory 213. In instances where underflow occurs, preprocessed data may be read from the modifiable buffer portion 216 and may be communicated to the DACs 218 or 220 for further processing.

In operation, input bitstream A 222 and input bitstream B 224 may be buffered by input buffers 202 and 204, respectively. Exemplary buffer bursts for input and output buffers is illustrated below, with regard to FIG. 3. The scheduling block 206 may acquire buffered bitstream data from the input buffers 202 and 204 and may determine a single bitstream output for communication to the processor 208. The scheduling block 206 may utilize one or more non-preemptive scheduling algorithms, such as an EDF scheduling algorithm or an RM scheduling algorithm, to schedule processing of audio tasks acquired from the input buffers 202 and 204. The processor 208 may then process, or decode a plurality of tasks scheduled by the scheduling block 206 and may buffer the processed, or decoded tasks within the output buffer 212 or 214. The processor 208 may be also adapted to preprocess a plurality of tasks from the input bitstream B 224 and buffer the preprocessed tasks in buffer section 216 within the output buffer 214. By utilizing preprocessing of scheduled tasks and buffering the preprocessed tasks within the modifiable buffer 214 that handles overflow and underflow, the processor 208 may be adapted to perform non-preemptive dual decoding of tasks from both input bitstream A 222 and input bitstream B 224 and complete the decoding by their corresponding real deadlines.

Buffered decoded frames may then be communicated for further processing from the output buffers 212 and 214 to the DACs 218 and 220, respectively. The DACs 218 and 220 may convert the processed digital audio data received from the output buffers 212 and 214 to analog output audio data stream A 226 and analog output audio data stream B 228.

Even though output buffer 214 may be modifiable by allocating the additional buffer space 216 for storing preprocessed tasks from the input bitstream B 224, the present invention is not so limited. In another embodiment of the invention, the output buffer 212 may be modified with additional buffer space, and the modifiable output buffer 212 may be utilized for storing preprocessed tasks from the input bitstream A 222.

Figure 3:
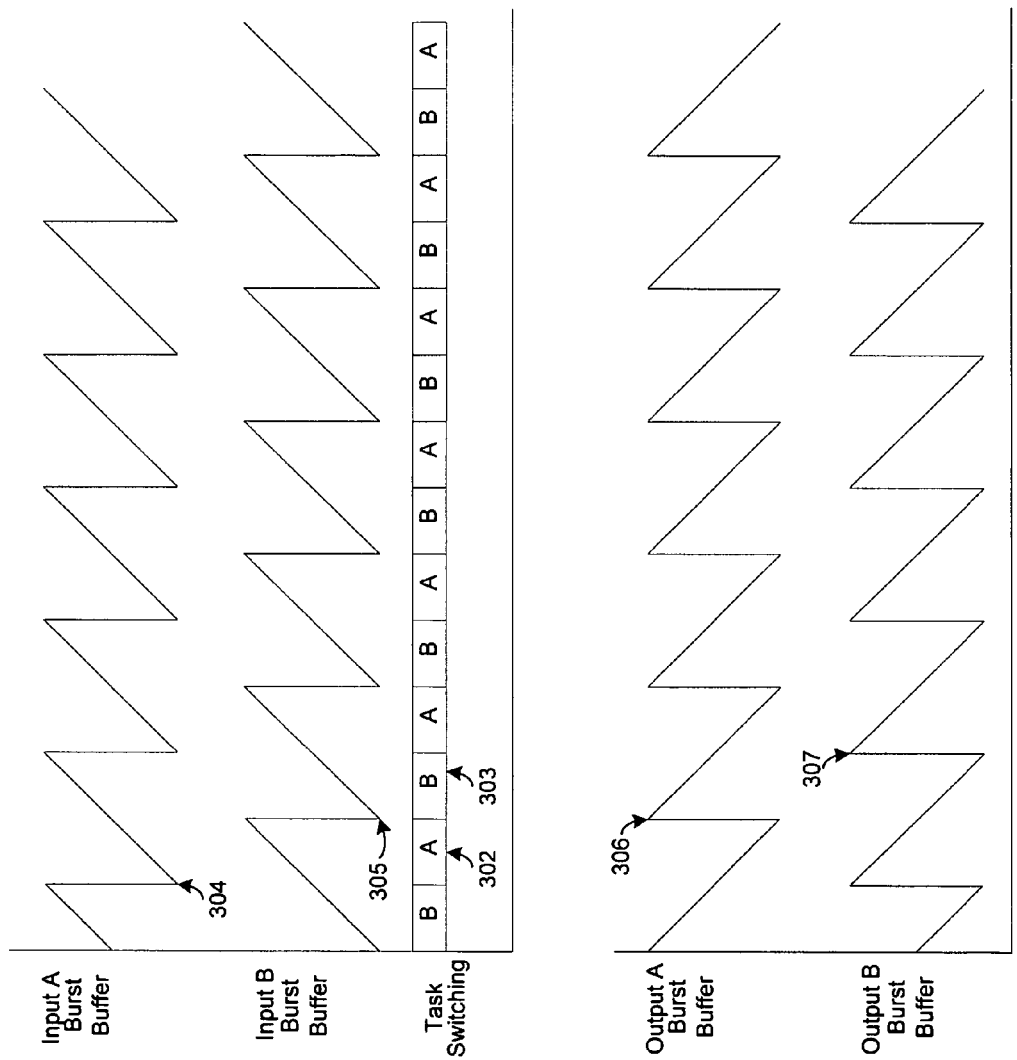
FIG. 3 is a diagram illustrating buffer bursts of exemplary input and output buffers which may be utilized in accordance with the system in FIG. 2B, for example, in accordance with an embodiment of the invention.

FIG. 3 is a diagram illustrating buffer bursts of exemplary input and output buffers which may be utilized in accordance with the system in FIG. 2B, for example, in accordance with an embodiment of the invention. Referring to FIGS. 2B and 3, there are illustrated buffer bursts for the input buffers 202 and 204, and buffer bursts for the output buffers 212 and 214. The processor 208 may be adapted to switch processing between tasks A and B, as illustrated in FIG. 3. Unprocessed data may be retrieved from an input buffer for processing by the processor 208 at the beginning of each corresponding task, and processed data may be stored in an output buffer at the completion of the corresponding task.

For example, at the beginning of task A 302 at time instant 304, unprocessed data may be retrieved from the input buffer 202. At the conclusion of task A 302 at time instant 306, data processed or decoded by the processor 208 may be stored in the output buffer 212. Similarly, at the beginning of task B 303 at time instant 305, unprocessed data may be retrieved from the input buffer 204. At the conclusion of task B 303 at time instant 307, data processed or decoded by the processor 208 may be stored in the output buffer 214.

Figure 4:
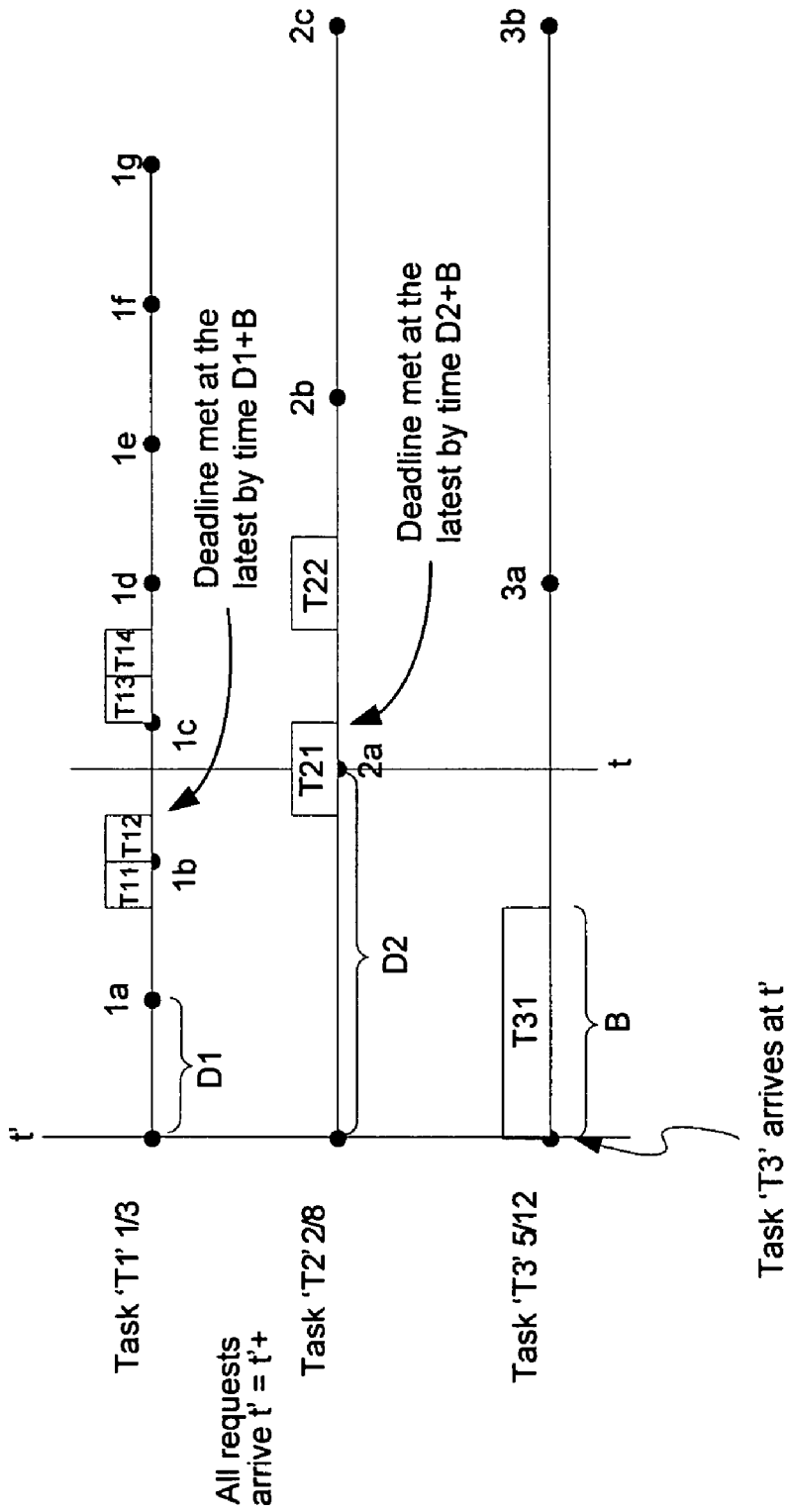
FIG. 4 is a diagram illustrating exemplary processing of multiple tasks utilizing earliest deadline first (EDF) scheduling, in accordance with an embodiment of the invention.

FIG. 4 is a diagram illustrating exemplary processing of multiple tasks utilizing earliest deadline first (EDF) scheduling, in accordance with an embodiment of the invention. With regard to an EDF scheduling algorithm, tasks may be scheduled in the following manner. When a task is ready to be executed, the deadline of the task may be computed. Tasks may be prioritized with the earliest deadline having the highest priority. If two tasks have the same deadline, either task may be executed first. For a system based on preemptive scheduling, the EDF scheduling algorithm may meet the following criteria:

$$\sum \frac{Ci}{Di} \leq 1,$$

where Ci=Computation time for task i and Di=Deadline for task i. For a system based on non-preemptive scheduling, the same scheduling criteria may be met. However, a task may not be serviced by the deadline Di, but rather may be serviced by the time Di+B, where B=max (Ci), or the maximum blocking task which executes non-preemptively ahead of any given task.

Referring to FIG. 4, tasks T1 and T2 may be tasks from two separate audio bitstreams with task periods of D1 and D2, respectively. Tasks T1 and T2 may comprise corresponding real deadlines 1a, ..., 1g, and 2a, ..., 2c, respectively. The task period D1 may comprise an interval during which task T1 may be executed once, such as the duration of the first deadline 1a of task T1. Similarly, the task period D2 may comprise an interval during which task T2 may be executed once, such as the duration of the first deadline 2a of task T2. Task T3 may be a blocking task with a duration B and deadlines of 3a and 3b. Task T31 may indicate a first execution of the blocking task T3. Similarly, tasks T11, ..., T14 may designate subsequent executions of task T1, and tasks T21, T22 may designate subsequent executions of task T2. Tasks T11, ..., T14 may have real deadlines 1a, ..., 1d, respectively. Tasks T21 and T22 may have real deadlines 2a and 2b, respectively.

Defining a time t' as the start of the blocking task T31 and a time t as the deadline of task T21, it may be concluded from FIG. 4 that only tasks that execute between [t', t] may have been released after t' and may have a deadline before t. Other tasks may not impact task T21. At time instant t, the deadline of task T21 has been impacted by the non-preemptive task T31, which may comprise a deadline 3a after time instant t. In the present exemplary scenario illustrated in FIG. 4, task T2 may be the lowest priority task, as it has the latest deadline in [t', t]. Other tasks, such as task T1, may execute within this time, but do not impact T2, as they may have a shorter deadline, and are therefore scheduled before T2 regardless of the blocking time B.

In an exemplary non-preemptive execution of tasks T1, T2, and T3, task T31 with duration B may be executed first, as a blocking task at time instant t'. Since T31 is a blocking task and is executed non-preemptively, execution of task T11 is blocked, resulting in task T11 missing its deadline 1a. After blocking task T31 is executed for the duration B, task T11 is the task with the next earliest deadline. In fact, task T11 has a negative deadline 1a since deadline 1a has already been missed. Task T11 may, therefore, be executed next and execution of task T11 may be completed by deadline 1b. At time instant 1b, task T12 is overdue and may be executed next, before deadline 1c. After task T12 is completed, the next earliest deadline is 2a, corresponding to task T21. Therefore, after completion of task T12, task T21 may be executed and may be completed shortly after its deadline 2a. After completion of task T21, the next earliest deadline is 1c, corresponding to task T13. Task T13 may then be executed, before deadline 1d. After execution of task T13, the next earliest deadline is 1d, corresponding to task T14. Task T14 may be executed after task T13 and ahead of its deadline 1d. After task T14, task T22 may be executed ahead of its deadline 2b.

In this regard, during an exemplary non-preemptive execution of tasks T1 and T2 and a blocking task T3 with a duration B, it may be illustrated from the above analysis that all tasks Ti may execute prior to time instant (Di+B), where i is the number of the task. For example, task T11 may be completed at the latest by time instant (D1+B), and task T21 may be completed at the most by time instant (D2+B). This information may be used to design a modifiable buffer that may handle overflow and underflow, for buffering preprocessed task scheduled with an EDF scheduling algorithm.

Figure 5:
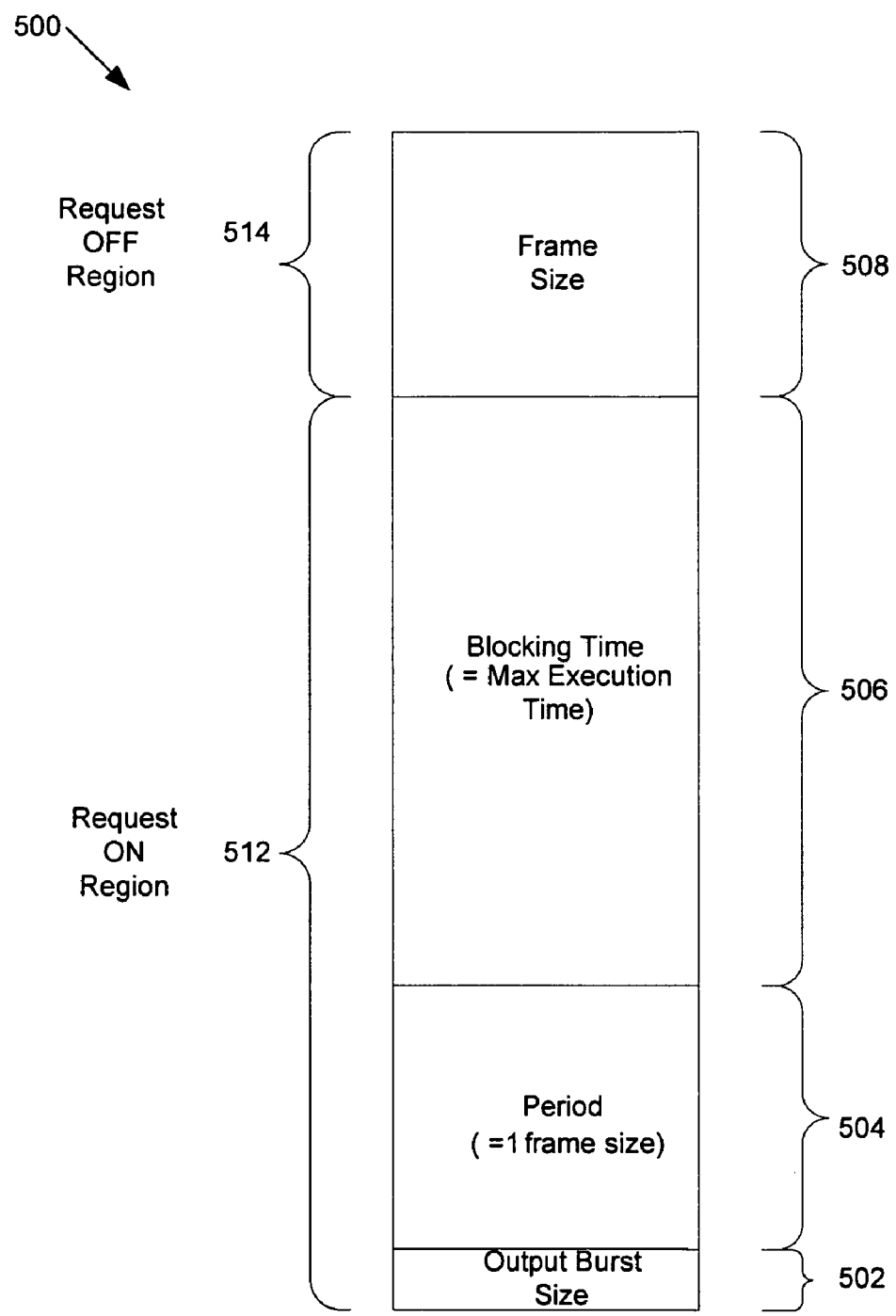
FIG. 5 is a block diagram of an exemplary modifiable prefill buffer that may be utilized with earliest deadline first (EDF) scheduling, in accordance with an embodiment of the invention.

FIG. 5 is a block diagram of an exemplary modifiable prefill buffer that may be utilized with earliest deadline first (EDF) scheduling, in accordance with an embodiment of the invention. Referring to FIG. 5, the modifiable prefill buffer 500 may comprise an output burst region 502, a task period region 504, a blocking time region 506, and a frame size region 508. The output burst region 502, the task period region 504, and the blocking time region 506 may form the request ON region 512. The request OFF region 514 may comprise the frame size region 508.

The output burst region 502 may comprise a buffer that may be used for read-ahead functionality of burst size adjustment hardware, for example. The task period region 504 may be of size equal to the task period used by tasks scheduled with EDF scheduling algorithm. In a task processing system utilizing an EDF scheduling algorithm, the task period equals one frame time divided by the sample rate, which equals one frame size. The blocking time region 506 may be of size equal to the amount of time a task is stalled due to non-preemption of an earlier task. In a task processing system utilizing an EDF scheduling algorithm, the blocking time may equal the maximum execution time of the longest non-preemptive task. For example, task T31 in FIG. 4 is the longest non-preemptive task and may, therefore, be considered as the blocking task with blocking time B. The frame size region 508 may be of size equal to one frame size allowing for instantaneous decoding. The frame size region 508 may be utilized to prevent overflow during non-preemptive processing of scheduled tasks.

Referring to FIGS. 2 and 5, buffer 500 may correspond to buffer 214 in FIG. 2B. The extra buffer space 216 may correspond to the request ON region 512. During an exemplary non-preemptive processing of scheduled tasks, the request OFF region 514 may be utilized to hold results of audio decoding, in instances when the processor 208 finishes decoding fast. When the buffer 500 is full into this region, the request for service or for decoding by the processor 208 may be turned OFF and the corresponding processed task may not run to prevent overflow.

The request ON region 512, or the underflow region may be utilized to prevent the buffer 500 from underflow while waiting for a task to be decoded by the processor 208. For a processing system utilizing an EDF scheduling algorithm, such as system 200, this portion of the buffer 500 may be sized according to the maximum blocking time plus a decode period. An additional buffer amount 502 may be included to prevent underflow in instances where output burst size adjustment hardware may read data slightly ahead of when it may be needed for presentation to the audio DAC 220.

In one embodiment of the invention, the request ON region 512 may be sized according to time. The time that a task waits and the period may be measured in μsec, for example, and may be converted to a buffer size in words based on the sample rate of the audio algorithm. In another embodiment of the invention, determining the extra buffer space 216, or the request ON region 512 within a modifiable buffer 500 may be achieved by determining the longest executing task, such as an advanced audio coding (AAC) task or a Dolby Digital task, multiplied by the fastest sample rate possible, resulting in the blocking time. The period for decode for an audio algorithm may be generated by multiplying the frame size by the sample rate.

Figure 6:
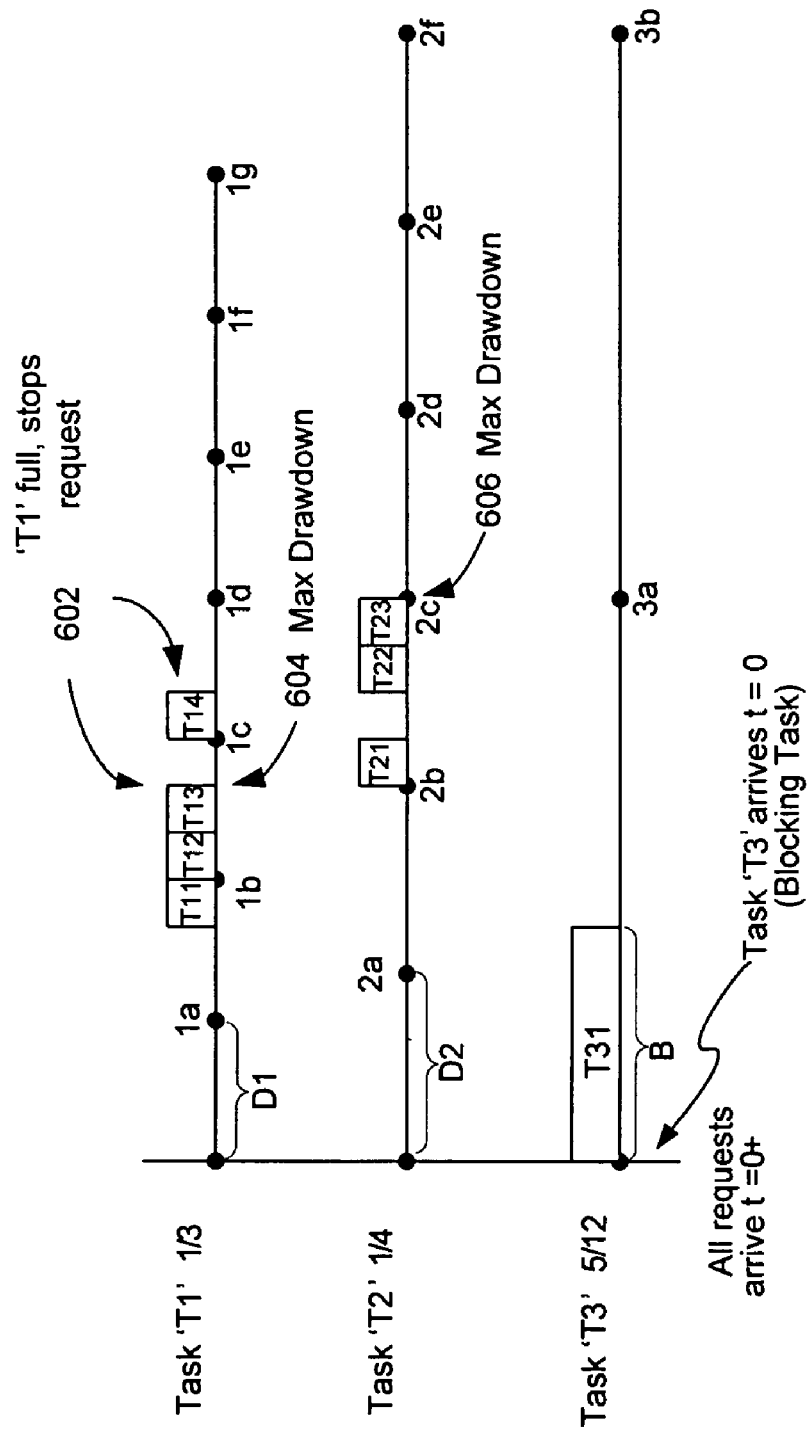
FIG. 6 is a diagram illustrating exemplary processing of multiple tasks utilizing rate monotonic (RM) scheduling, in accordance with an embodiment of the invention.

FIG. 6 is a diagram illustrating exemplary processing of multiple tasks utilizing rate monotonic (RM) scheduling, in accordance with an embodiment of the invention. With regard to an RM scheduling algorithm, tasks may be scheduled in the following manner. When a task is ready to execute, the task priority may be computed relative to the other tasks. Tasks may be prioritized with the shortest deadline having the highest priority, and the priority may be static and precomputed for all tasks. If two tasks have the same deadline, either task may be executed first. For a system based on preemptive scheduling, a critical instant analysis may be utilized to determine whether the RM scheduling algorithm may be utilized to schedule all tasks. During critical instant analysis, it may be assumed that all tasks are being requested by clients at their maximum rate. In this regard, if all tasks may be executed by their deadline, it may be considered that the system is schedulable utilizing an RM scheduling algorithm.

Referring to FIG. 6, tasks T1 and T2 may be tasks from two separate audio bitstreams with task periods of D1 and D2, respectively. Tasks T1 and T2 may comprise corresponding real deadlines 1a, . . . , 1g, and 2a, . . . , 2f, respectively. The task period D1 may comprise duration during which task T1 may be executed once, such as the duration of the first deadline 1a of task T1. Similarly, the task period D2 may comprise an interval during which task T2 may be executed once, such as the duration of the first deadline 2a of task T2. Task T3 may be a blocking task with a duration B and deadlines of 3a and 3b. Task T31 may indicate a first execution of the blocking task T3. Similarly, tasks T11, . . . , T14 may designate subsequent executions of task T1, and tasks T21, . . . , T23 may designate subsequent executions of task T2. Tasks T11, . . . , T14 may have real deadlines 1a, . . . , 1d, respectively. Tasks T21, . . . , T23 may have real deadlines 2a, . . . , 2c, respectively.

During an exemplary non-preemptive task processing scenario utilizing an RM scheduling algorithm, the lowest priority tasks may wait while the high priority tasks catch up after a blocking event. The blocking task T3 may arrive at time t, slightly prior to the other tasks in the system. This may result in missed deadlines for tasks T1 and T2. However, if a modifiable buffer, such as buffer 214 in FIG. 2B, is utilized to handle this overrun, these tasks may catch-up in a system that is not over-loaded.

Referring to FIG. 6, task T1 has a shorter deadline and, therefore, has higher priority than task T2, if RM scheduling is utilized to schedule the tasks. Blocking task T31 may execute first for a duration B. After blocking task T31 completes execution, task T1 may execute continuously as tasks T11, . . . , T13 until its buffer is full at time instant 602, after executing task T13. At time instant 602, task T1 may stop any further task execution and the next priority task, T2, may begin execution. Task T2 may begin execution after T1 has stopped requesting at time instant 602, at the completion of task T13. Task T21 may execute until it has recovered its buffer fullness. Execution of task T2 may be interrupted by task T1 periodically, as task T1 may require. For example, as the task T1 buffer is emptied, after task T21 is processed, task T14 may be processed next as a task with higher priority.

As illustrated in FIG. 6, tasks T1 and T2 subsequently recover and complete processing by their corresponding real deadlines. The maximum buffer drawdown for both tasks T1 and T2 may occur between time interval t, when the blocking task T31 starts execution, and when the real deadline is finally met for each task. For example, the maximum buffer drawdown for task T1 may occur at time instant 604, after task T13 is completed and before execution of task T21 begins. The maximum buffer drawdown for task T2 may occur at time instant 606, after task T23 is completed by its real deadline 2c. In an exemplary embodiment of the invention, when RM scheduling is utilized in a non-preemptive task-processing system, a blocking time prior to processing of a desired task may comprise the maximum execution time of a blocking task, duration B of the blocking task T31, plus the execution time of all higher priority tasks. This information may be used to design a modifiable buffer that may handle overflow and underflow, for buffering preprocessed task scheduled with an RM scheduling algorithm.

Figure 7:
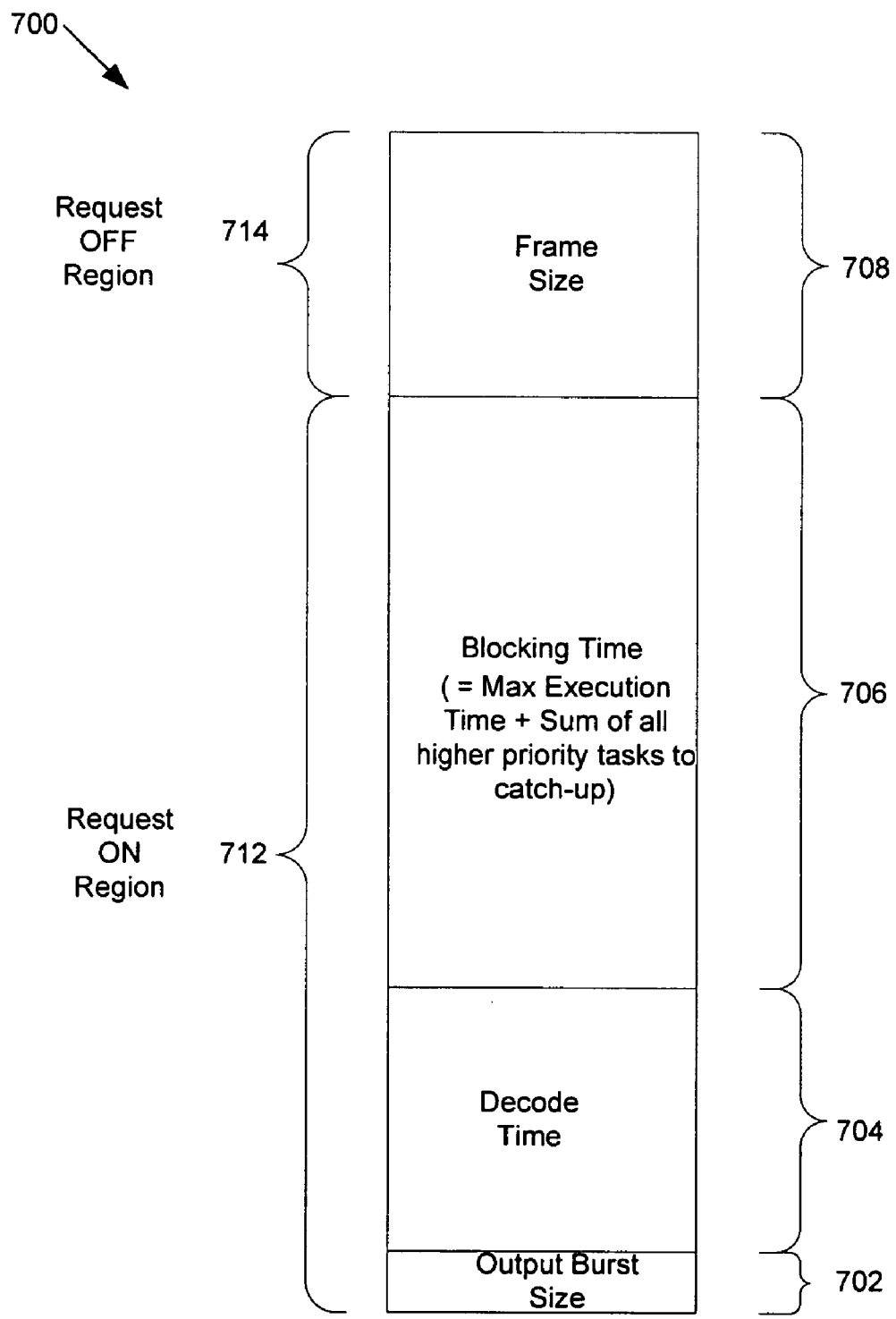
FIG. 7 is a block diagram of an exemplary modifiable prefill buffer that may be utilized with rate monotonic (RM) scheduling, in accordance with an embodiment of the invention.

FIG. 7 is a block diagram of an exemplary modifiable prefill buffer that may be utilized with rate monotonic (RM) scheduling, in accordance with an embodiment of the invention. Referring to FIG. 7, the modifiable prefill buffer 700 may comprise an output burst region 702, a decode time region 704, a blocking time region 706, and a frame size region 708. The output burst region 702, the decode time region 704, and the blocking time region 706 may form the request ON region 712. The request OFF region 714 may comprise the frame size region 708.

The output burst region 702 may comprise a buffer that may be used for read-ahead functionality of burst size adjustment hardware, for example. The decode time region 704 may be of size equal to the amount of time that may be required to decode the desired task which is scheduled with an RM scheduling algorithm. The blocking time region 706 may be of size equal to the amount of time a task is stalled due to non-preemption of a blocking task and all earlier tasks with higher priority. In a task processing system utilizing an RM scheduling algorithm, the blocking time may equal the maximum execution time of the longest non-preemptive task plus the sum of the execution times of all higher priority tasks. For example, task T31 in FIG. 6 is the longest non-preemptive task and may, therefore, be considered as the blocking task with blocking time B. If task T2 is the desired task, then the execution time of task T1 may be added to the duration B of the blocking task T31 to obtain the size of the blocking time region 706. The frame size region 708 may be of size equal to one frame size allowing instantaneous decoding. In this regard, the frame size region 708 may be utilized to prevent overflow during non-preemptive processing of scheduled tasks.

Referring to FIGS. 2 and 7, buffer 700 may correspond to buffer 214 in FIG. 2B. The extra buffer space 216 may correspond to the request ON region 712. During an exemplary non-preemptive processing of scheduled tasks, the request OFF region 714 may be utilized to hold results of audio decoding, in instances when the processor 208 finishes decoding quickly. When the buffer 700 is full into the request OFF region 714, the request for service or for decoding by the processor 208 may be turned OFF and the corresponding processed task may not run to prevent overflow.

The request ON region 712, or the underflow region, may be utilized to prevent the buffer 700 from underflow while waiting for a task to be decoded by the processor 208. For a processing system utilizing an EDF scheduling algorithm, such as system 200, this portion of the buffer 700 may be sized according to the maximum blocking time, region 706, plus a decode period, region 704. An additional buffer amount 702 may be included to prevent underflow in instances where output burst size adjustment hardware may read data slightly ahead of when it may be needed for presentation to the audio DAC 220.

In one embodiment of the invention, the request ON region 712 may be sized according to time. The time that a task waits and the period may be measured in µsec, for example, and may be converted to a buffer size in words based on the sample rate of the audio algorithm. In another embodiment of the invention, determining the extra buffer space 216, or the request ON region 712 within the modifiable buffer 700 may be achieved by determining the longest executing task, such as an advanced audio coding (AAC) task or a Dolby Digital task, multiplied by the fastest sample rate possible. To obtain the blocking time, the result of the multiplication may be added to the execution times of all higher priority tasks, resulting in the blocking time. The period for decode for an audio algorithm may be generated by multiplying the frame time by the sample rate, or the frame size.

Figure 8:
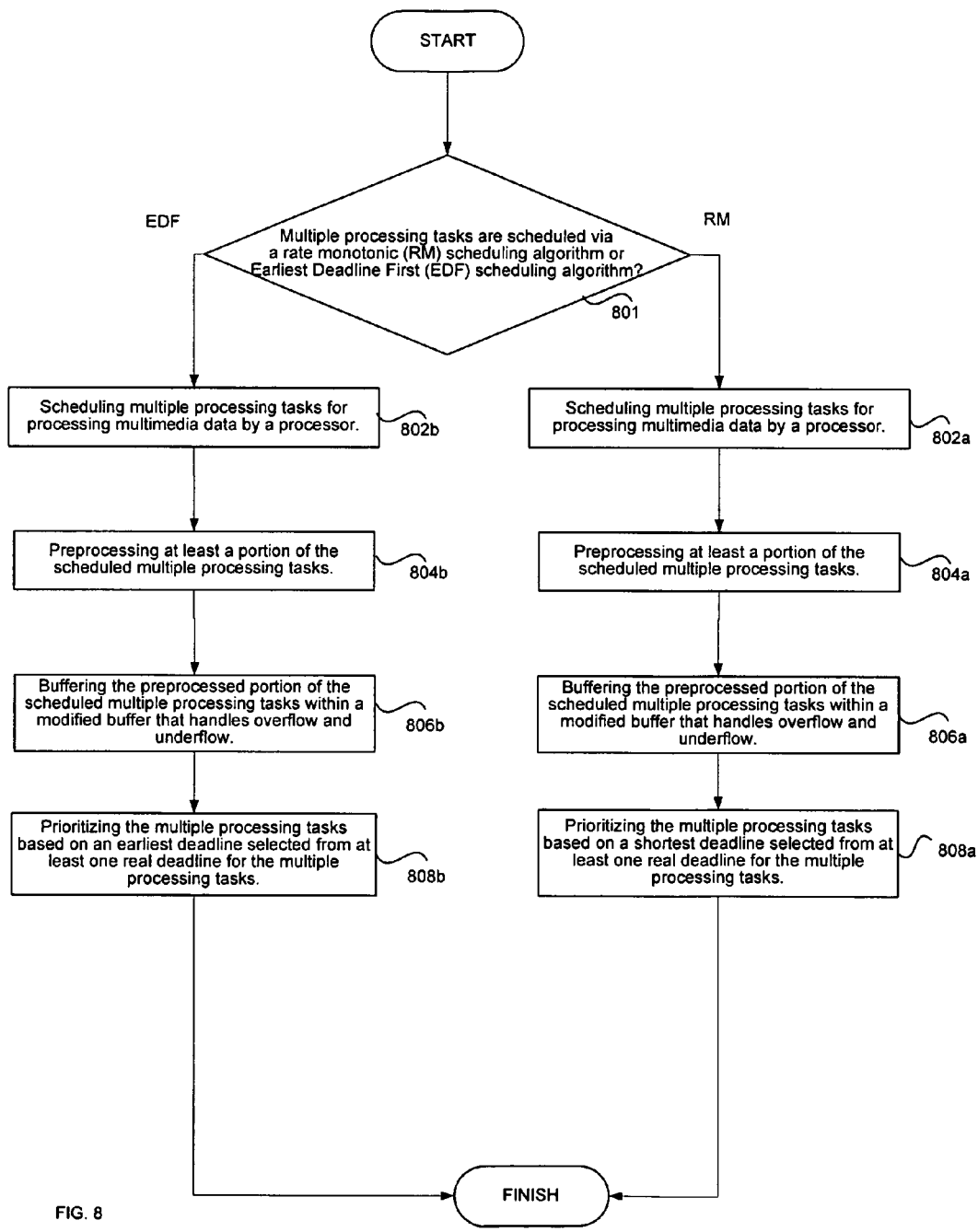
FIG. 8 is a flow diagram illustrating exemplary steps for coordinating the handling of information, in accordance with an embodiment of the invention.

FIG. 8 is a flow diagram illustrating exemplary steps for coordinating the handling of information, in accordance with an embodiment of the invention. Referring to FIGS. 2B and 8, at 801, it may be determined whether multiple processing tasks are scheduled by the scheduling block 206 via a rate monotonic (RM) scheduling algorithm or via an earliest deadline first (EDF) scheduling algorithm. If multiple processing tasks are scheduled by the scheduling block 206 via a rate monotonic (RM) scheduling, at 802a, the scheduling block 206 may schedule multiple processing tasks for processing multimedia data from the input bitstreams 222 or 224 by the processor 208. At 804a, the processor 208 may preprocess at least a portion of the scheduled multiple processing tasks from the input bitstreams 222 or 224. At 806a, the preprocessed portion of the scheduled multiple processing tasks may be buffered within the modifiable buffer 214 that handles overflow and underflow. At 808a, the multiple processing tasks may be prioritized by the processor 208 based on a shortest deadline selected from at least one real deadline for the multiple processing tasks.

If the multiple processing tasks are scheduled by the scheduling block 206 via an earliest deadline first (EDF) scheduling algorithm, at 802b, the scheduling block 206 may schedule multiple processing tasks for processing multimedia data from the input bitstreams 222 or 224 by the processor 208. At 804b, the processor 208 may preprocess at least a portion of the scheduled multiple processing tasks from the input bitstreams 222 or 224. At 806b, the preprocessed portion of the scheduled multiple processing tasks may be buffered within the modifiable buffer 214 that handles overflow and underflow. At 808b, the multiple processing tasks may be prioritized by the processor 208 based on an earliest deadline selected from at least one real deadline for the multiple processing tasks.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for coordinating the handling of information, the method comprising:
    scheduling multiple processing tasks for processing multimedia data by a processor;
    prioritizing said multiple processing tasks based on a deadline selected from at least one real deadline for said multiple processing tasks;
    preprocessing at least a portion of said scheduled and prioritized multiple processing tasks ahead of a respective scheduled execution time associated with said at least said portion of said scheduled and prioritized multiple processing tasks; and
    buffering information of said preprocessed portion of said scheduled multiple processing tasks within a modifiable buffer that handles overflow and underflow.

2. The method according to claim 1, comprising executing at least a portion of said buffered preprocessed portion of said scheduled multiple processing tasks.

3. The method according to claim 1, wherein said scheduling utilizes a non-preemptive scheduling algorithm.

4. The method according to claim 3, wherein said scheduling algorithm comprises one or both of an earliest deadline first (EDF) scheduling algorithm and/or a rate monotonic (RM) scheduling algorithm.

5. The method according to claim 1, wherein said scheduled multiple processing tasks comprise at least one maximum real deadline.

6. The method according to claim 1, comprising, if a current task of said scheduled multiple processing tasks comprises a blocking task, outputting said information of said preprocessed portion of said scheduled multiple processing tasks during processing of said blocking task.

7. The method according to claim 1, comprising outputting said information of said preprocessed portion of said scheduled multiple processing tasks, based on at least one real deadline for said scheduled multiple processing tasks.

8. The method according to claim 1, comprising, if said multiple processing tasks are scheduled via a rate monotonic (RM) scheduling algorithm, prioritizing said multiple processing tasks based on a shortest deadline selected from said at least one real deadline for said multiple processing tasks.

9. The method according to claim 8, comprising prioritizing said multiple processing tasks prior to processing of at least one current task selected from said multiple processing tasks.

10. The method according to claim 1, comprising, if said multiple processing tasks are scheduled via an earliest deadline first (EDF) scheduling algorithm, prioritizing said multiple processing tasks based on an earliest deadline selected from said at least one real deadline for said multiple processing tasks.

11. A non-transitory machine-readable storage having stored thereon, a computer program having at least one code section for coordinating the handling of information, the at least one code section being executable by a machine for causing the machine to perform steps comprising:
    scheduling multiple processing tasks for processing multimedia data by a processor;
    prioritizing said multiple processing tasks based on a deadline selected from at least one real deadline for said multiple processing tasks;
    preprocessing at least a portion of said scheduled and prioritized multiple processing tasks ahead of a respective scheduled execution time associated with said at least said portion of said scheduled and prioritized multiple processing tasks; and
    buffering information of said preprocessed portion of said scheduled multiple processing tasks within a modifiable buffer that handles overflow and underflow.

12. The machine-readable storage according to claim 11, comprising code for executing at least a portion of said buffered preprocessed portion of said scheduled multiple processing tasks.

13. The machine-readable storage according to claim 11, wherein said scheduling utilizes a non-preemptive scheduling algorithm.

14. The machine-readable storage according to claim 13, wherein said scheduling algorithm comprises one or both of an earliest deadline first (EDF) scheduling algorithm and/or a rate monotonic (RM) scheduling algorithm.

15. The machine-readable storage according to claim 11, wherein said scheduled multiple processing tasks comprise at least one maximum real deadline.

16. The machine-readable storage according to claim 11, comprising code for outputting said information of said preprocessed portion of said scheduled multiple processing tasks during processing of said blocking task, if a current task of said scheduled multiple processing tasks comprises a blocking task.

17. The machine-readable storage according to claim 11, comprising code for outputting said information of said preprocessed portion of said scheduled multiple processing tasks, based on at least one real deadline for said scheduled multiple processing tasks.

18. The machine-readable storage according to claim 11, comprising code for prioritizing said multiple processing tasks based on a shortest deadline selected from said at least one real deadline for said multiple processing tasks, if said multiple processing tasks are scheduled via a rate monotonic (RM) scheduling algorithm.

19. The machine-readable storage according to claim 18, comprising code for prioritizing said multiple processing tasks prior to processing of at least one current task selected from said multiple processing tasks.

20. The machine-readable storage according to claim 11, comprising code for prioritizing said multiple processing tasks based on an earliest deadline selected from said at least one real deadline for said multiple processing tasks, if said multiple processing tasks are scheduled via an earliest deadline first (EDF) scheduling algorithm.

21. A system for coordinating the handling of information, the system comprising:
  at least one processor that enables scheduling of multiple processing tasks for processing multimedia data;
  said at least one processor enables prioritizing said multiple processing tasks based on a deadline selected from at least one real deadline for said multiple processing tasks;
  said at least one processor enables preprocessing of at least a portion of said scheduled and prioritized multiple processing tasks ahead of a respective scheduled execution time associated with said at least said portion of said scheduled and prioritized multiple processing tasks; and
  said at least one processor enables buffering information of said preprocessed portion of said scheduled multiple processing tasks within a modifiable buffer that handles overflow and underflow.

22. The system according to claim 21, wherein said at least one processor enables execution of at least a portion of said buffered preprocessed portion of said scheduled multiple processing tasks.

23. The system according to claim 21, wherein said scheduling utilizes a non-preemptive scheduling algorithm.

24. The system according to claim 23, wherein said scheduling algorithm comprises one or both of an earliest deadline first (EDF) scheduling algorithm and/or a rate monotonic (RM) scheduling algorithm.

25. The system according to claim 21, wherein said scheduled multiple processing tasks comprise at least one maximum real deadline.

26. The system according to claim 21, wherein said at least one processor enables outputting of said information of said preprocessed portion of said scheduled multiple processing tasks during processing of said blocking task, if a current task of said scheduled multiple processing tasks comprises a blocking task.

27. The system according to claim 21, wherein said at least one processor enables outputting of said information of said preprocessed portion of said scheduled multiple processing tasks, based on at least one real deadline for said scheduled multiple processing tasks.

28. The system according to claim 21, wherein said at least one processor enables prioritizing of said multiple processing tasks based on a shortest deadline selected from said at least one real deadline for said multiple processing tasks, if said multiple processing tasks are scheduled via a rate monotonic (RM) scheduling algorithm.

29. The system according to claim 28, wherein said at least one processor enables prioritizing of said multiple processing tasks prior to processing of at least one current task selected from said multiple processing tasks.

30. The system according to claim 21, wherein said at least one processor enables prioritizing of said multiple processing tasks based on an earliest deadline selected from said at least one real deadline for said multiple processing tasks, if said multiple processing tasks are scheduled via an earliest deadline first (EDF) scheduling algorithm.

* * * * *